United States Patent
Iwaguchi et al.

[11] Patent Number: 5,965,864
[45] Date of Patent: Oct. 12, 1999

[54] SLICING RATIO CONTROLLING CIRCUIT

[75] Inventors: Isao Iwaguchi; Hiroaki Kawai; Mitsuo Watanabe; Motohiko Itoh; Shinichi Satoh, all of Kawasaki, Japan

[73] Assignee: Fujitsu Limited, Kawasaki, Japan

[21] Appl. No.: 08/925,480

[22] Filed: Sep. 8, 1997

[30] Foreign Application Priority Data

Nov. 29, 1996 [JP] Japan ..................... 8-319031

[51] Int. Cl.$^6$ ..................... G06K 7/10
[52] U.S. Cl. ............... 235/462.25; 235/462.29; 235/454; 235/472.01
[58] Field of Search ............... 235/436, 462, 235/463, 472, 454, 462.07, 462.25, 462.27, 462.28, 462.29, 470, 472.01, 472.02

[56] References Cited

U.S. PATENT DOCUMENTS

| | | | |
|---|---|---|---|
| 4,329,684 | 5/1982 | Monteath et al. ............... | 235/472 |
| 5,061,843 | 10/1991 | Sato et al. ............... | 235/462 |
| 5,068,520 | 11/1991 | Sato ............... | 235/462 |
| 5,569,905 | 10/1996 | Ohkawa et al. ............... | 235/462 |
| 5,600,118 | 2/1997 | Sato et al. ............... | 235/462 |

*Primary Examiner*—Michael G. Lee
*Assistant Examiner*—Daniel St. Cyr
*Attorney, Agent, or Firm*—Armstrong, Westerman, Hattori, Mcleland & Naughton

[57] ABSTRACT

A slicing ratio controlling circuit for controlling the ratio of a slice level used when binarizing an input signal with respect to the signal to be sliced, including a differentiating unit for differentiating the input signal; a peak holding unit for receiving the differentiated signal from the differentiating unit and holding its peak level so as to generate a slice level signal; and a constant ratio enabling unit for making the ratio of the slice level signal from the peak holding unit with respect to the differentiated signal constituting the signal to be sliced a constant ratio regardless of the magnitude of the differentiated signal.

20 Claims, 9 Drawing Sheets

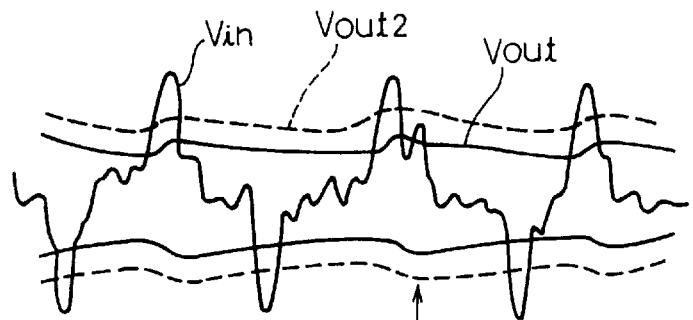
Fig.7A
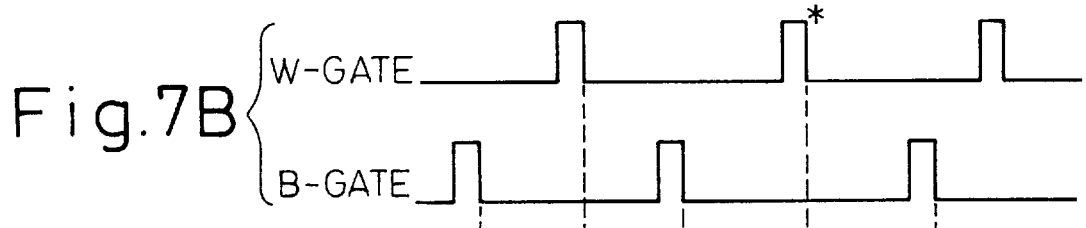
Fig.7B { W-GATE / B-GATE
Fig.7C  *PKS
Fig.7D { *WEG / *BEG

Fig. 8A

| R1 | R2 | Vlim | Gnd | Vf |
|---|---|---|---|---|
| 6.20E+04 | 3.60E+04 | 0.2 | 0 | 0.3 |

Fig. 8B

| Vin | Vout2/Vin | Vout/Vin | Vout2 | Vout |
|---|---|---|---|---|
| 0.00001 | 2000000 | 2000000 | 0.2 | 0.2 |
| 0.00005 | 400000 | 400000 | 0.2 | 0.2 |
| 0.0001 | 200000 | 200000 | 0.2 | 0.2 |
| 0.0005 | 40000 | 40000 | 0.2 | 0.2 |
| 0.001 | 20000 | 20000 | 0.2 | 0.2 |
| 0.005 | 4000 | 4000 | 0.2 | 0.2 |
| 0.01 | 2000 | 2000 | 0.2 | 0.2 |
| 0.05 | 400 | 400 | 0.2 | 0.2 |
| 0.07 | 285.7143 | 285.7143 | 0.2 | 0.2 |
| 0.1 | 200 | 200 | 0.2 | 0.2 |
| 0.2 | 100 | 100 | 0.2 | 0.2 |   ← $<\gamma>$
| 0.4 | 50 | 50 | 0.2 | 0.2 |
| 0.6 | 39.45578 | 33.33333 | 0.236735 | 0.2 |
| 0.8 | 38.77551 | 25 | 0.310204 | 0.2 |   ← $<\alpha>$
| 1 | 38.36735 | 25.71429 | 0.383673 | 0.257143 |
| 1.5 | 37.82313 | 29.38776 | 0.567347 | 0.440816 |
| 2 | 37.55102 | 31.22449 | 0.75102 | 0.62449 |
| 2.5 | 37.38776 | 32.32653 | 0.934694 | 0.808163 |
| 3 | 37.27891 | 33.06122 | 1.118367 | 0.991837 |   ← $<\beta>$
| 3.5 | 37.20117 | 33.58601 | 1.302041 | 1.17551 |
| 4 | 37.14286 | 33.97959 | 1.485714 | 1.359184 |
| 5 | 37.06122 | 34.53061 | 1.853061 | 1.726531 |
| 6 | 37.0068 | 34.89796 | 2.220408 | 2.093878 |

Vout2/Vin (PRESENT INVENTION)
Vout/Vin (PRIOR ART)
Vout2 (PRESENT INVENTION)
Vout (PRIOR ART)

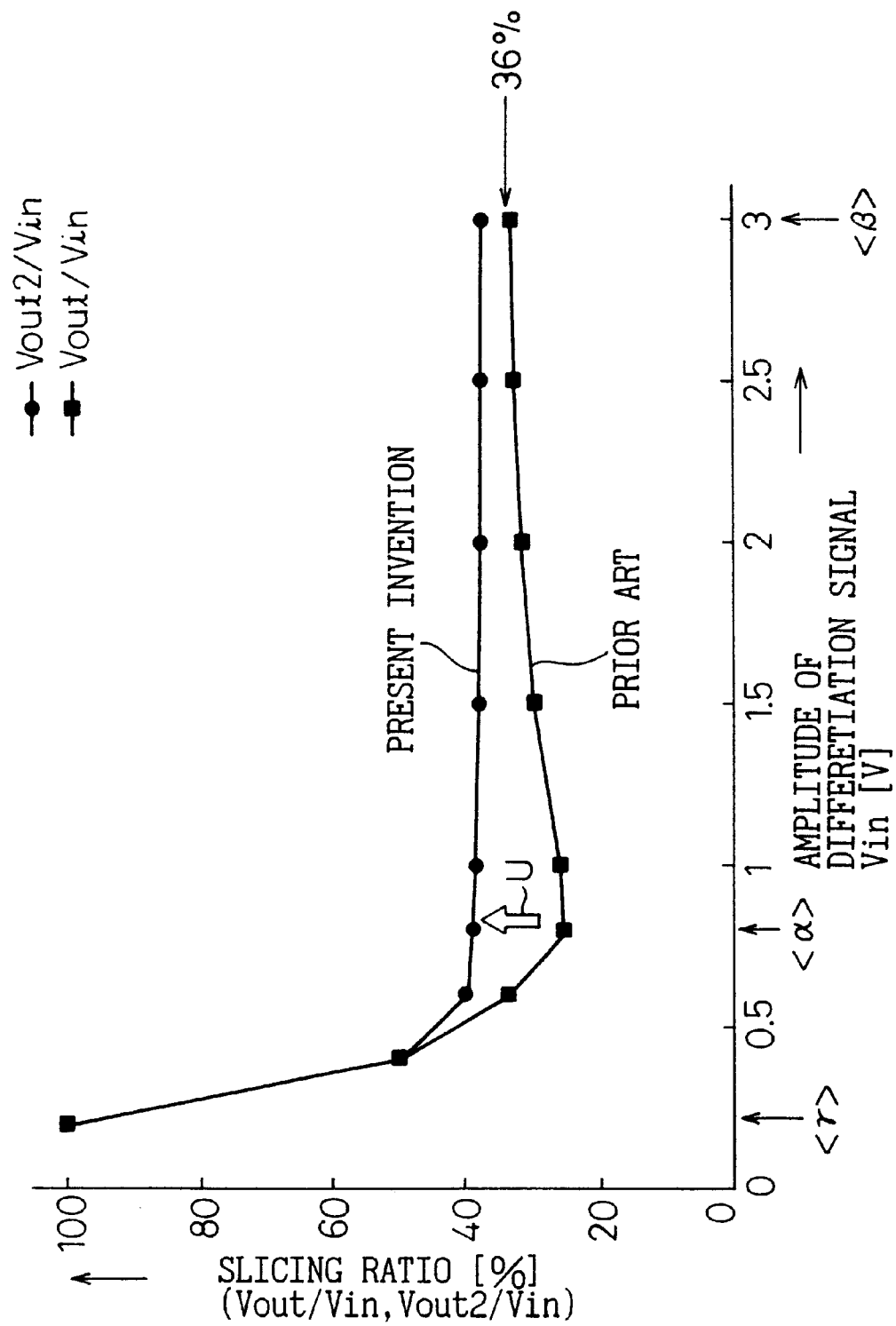

SLICING RATIO CONTROLLING CIRCUIT

BACKGROUND OF THE INVENTION

1. Field of the Invention

The present invention relates to a slicing ratio controlling circuit for controlling a ratio of a slice level used for binarization of a signal, more particularly relates to a slicing ratio controlling circuit for controlling a ratio of a slice level and an input signal for use for binarization of a signal in a bar code reader etc.

In general, a bar code reader illuminates a bar code, detects the reflected light, and recognizes the black bars and white bars making up the bar code in accordance with the brightness. Since the brightness changes by a large degree at the juncture of the black bars and white bars, the point of change is used to find the juncture between black bars and white bars and thereby detect them.

2. Description of the Related Art

As will be explained in detail later with reference to the drawings, the amount of the reflected light received from the portions corresponding to the white bars is large, while the amount of the reflected light received from the portions corresponding to the black bars is small. Therefore, it is possible to compare the light reflected from the bar code with the magnitude of a threshold signal (slice level) to recognize white and black bars.

The amount of light reflected from a bar code changes tremendously depending on the distance between the bar code and the bar code reader and the angle between the bar code and the illuminated light (reflected light). In some cases, the amount of reflected light from the bar code received by the bar code reader may become extremely small. Therefore, if the slice level is set to a fixed value and if the amount of light reflected from the bar code is small, there is a chance that the reflected light will always be recognized as being smaller than the slice level. Conversely, if the amount of light reflected from the bar code is extremely large, there is a chance that the reflected light will always be larger than the slice level.

To solve this problem, the previous practice has been to generate the slice level based on the amount of the reflected light received by the bar code reader (signal output by photodetector). Use of this technique enables the slice level to be changed in accordance with the amount of reflected light received by the bar code reader and therefore the above problem to be eliminated. This slice level signal is generated by inputting the signal output from the photodetector into a peak holding circuit. The magnitude of the slice level signal is set to have a specific ratio with respect to the amount of the received light.

If the amount of the light reflected from the bar code is small, however, there is a chance that noise may become noticeable in the signal from the photodetector. On the other hand, if the slice level signal is generated from the peak holding circuit, there is a chance that, depending on the configuration of the peak holding circuit, the magnitude of the slice level signal generated by it will not become the envisioned ratio with respect to the magnitude of the signal to be sliced but will become smaller than this.

If this situation arises, then when comparing the signal to be sliced and the slice level signal for binarization of the input signal and detection of the white bars and black bars, there is the problem that the noise component superposed on the signal from the photodetector will exceed the slice level signal and result in erroneous detection. This tendency becomes more marked when the amount of the light reflected from the bar code is small.

SUMMARY OF THE INVENTION

An object of the present invention is to provide a slicing ratio controlling circuit able to generate a slice level signal realizing a predetermined ratio of magnitude regardless of the amount of light reflected from the bar code.

To attain the above object, the present invention provides a slicing ratio controlling circuit which handles a signal (Vin) output from a differentiating circuit through a peak holding circuit to obtain a slice level signal (Vout). To compensate for the drop in level of the slice level signal (Vout) due to the forward voltage (Vf) of the diode, another voltage (Vlim) is supplied to one end of the resistor (R2) constituting part of a voltage dividing circuit. This eliminates the effect of the forward voltage (Vf) of the diode and thereby enables generation of a slice level having a predetermined ratio with respect to the signal to be sliced.

As a result, the slicing ratio controlling circuit of the present invention can attain a predetermined constant ratio of a slice level with respect to a signal to be sliced at the time of generation of the slice level used for binarization of a bar code without regard as to the magnitude of the signal to be sliced.

BRIEF DESCRIPTION OF THE DRAWINGS

These and other objects and features of the present invention will become more apparent from the following description of the preferred embodiments given with reference to the attached drawings, in which:

FIGS. 3A to 3D are views of signal waveforms at different parts showing problems in the binarizing circuit of FIG. 1;

FIGS. 7A to 7D are views of signal waveforms at different parts in FIG. 6;

FIGS. 8A and 8B are views of the correspondence between the differentiation signal Vin and the slice level signals (Vout and Vout2);

FIG. 9 is a graph of the correspondence between the differentiation signal Vin and the slicing ratios (Vout/Vin and Vout2/Vin);

DESCRIPTION OF THE PREFERRED EMBODIMENTS

Before describing the embodiments of the present invention, the related art and the disadvantages therein will be described with reference to the related figures.

Figure 1:
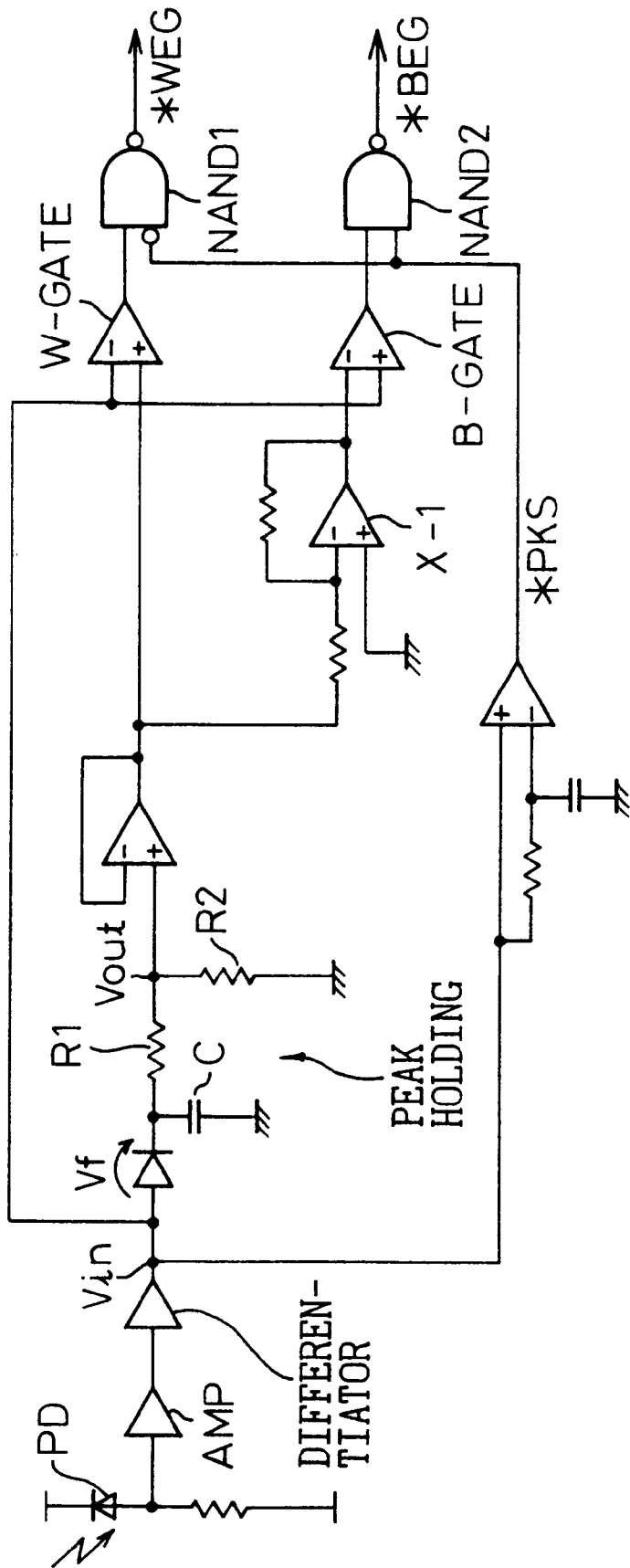
FIG. 1 is a view of a binarizing circuit of a bar code reader provided with a peak holding circuit.

FIG. 1 is a view of a binarizing circuit of a bar code reader provided with a peak holding circuit. Further, FIGS. 2A to 2F are views of signal waveforms at different parts of FIG. 1.

The circuit of FIG. 1 will be used to give a general explanation of a binarizing operation of a bar code. The circuit of FIG. 1 shows a binarizing circuit of a generally known bar code reader which functions to receive light reflected from a bar code, binarize its signal, and detect the black bars and white bars comprising the bar code.

The light reflected from the bar code is detected by a photodetector PD. The photodetector outputs a signal having a magnitude in accordance with the received amount of light reflected from the bar code. Next, the signal output from the photodetector is input to an amplifier (AMP in the figure) where it is amplified. The signal output from the amplifier is input next to a differentiating circuit.

Figure 2A:
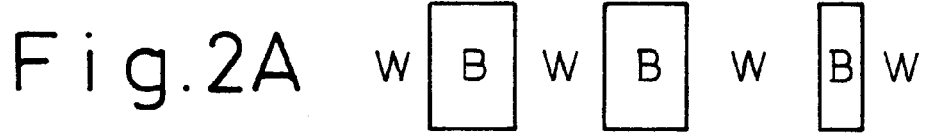
FIGS. 2A to 2F are views of signal waveforms at different parts of FIG. 1.
Figure 2B:

FIG. 2A shows the configuration of the bar code. A bar code is usually comprised by white bar portions and black bar portions. The light reflected from such a bar code becomes as illustrated in FIG. 2B. The amount of light reflected from the bar code differs at the black bar portions and the white bar portions. The white bar portions have a large reflectance, so the amount of reflected light becomes larger. On the other hand, the black bar portion has a smaller reflectance than the white bar portions, so the amount of reflected light becomes smaller. Accordingly, the signal waveform output from the photodetector becomes large at the white bar portions and smaller at the black bar portions as shown in FIG. 2B.

The signal shown in FIG. 2B changes considerably in magnitude at the juncture between a black bar and a white bar or a white bar and a black bar. Therefore, by detecting the changing point of the signal which has a waveform such as shown in FIG. 2B, it becomes possible to find the juncture between a white bar and black bar. With just using the signal of FIG. 2B, however, it is not easy to find which portion constitutes the changing point. Therefore, the signal of FIG. 2B is differentiated by the differentiating circuit to facilitate the determination of the changing point of the signal.

Figure 2C:
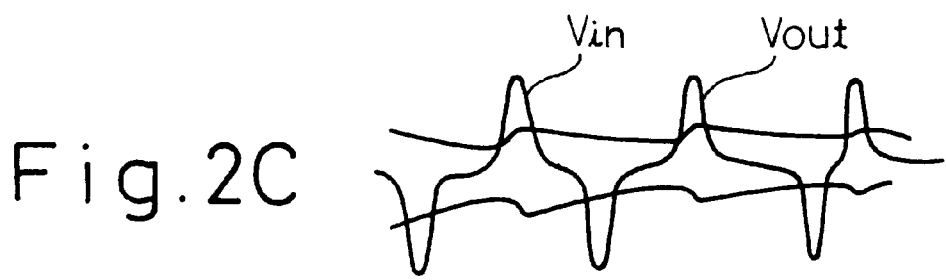

FIG. 2C is a view of a waveform of the output signal (Vin), i.e., differentiated signal, from the differentiating circuit. If the waveform of FIG. 2B is differentiated, the waveform shown in FIG. 2C is obtained. The portions of the peaks of the signal Vin shown in FIG. 2C correspond to the changing points of the signal shown in FIG. 2B. The positive peaks of Vin in FIG. 2B show the points of change from the black bars to the white bars, while the negative peaks show the points of change from the white bars to the black bars. By detecting the peaks of the differentiated waveform, detection of the edges of the bar code becomes easier.

To detect the peak of a differentiated waveform, it is sufficient to compare the differentiated signal with a slice level signal having a certain magnitude and judge if the differentiated signal exceeds the slice level signal. Here, as explained before, to make the magnitude of the slice level signal a magnitude suited to the reflected light received, a slice level signal is generated using a peak holding circuit.

The peak holding circuit is illustrated in the circuit shown in FIG. 1 as well. The peak holding circuit is comprised by a diode, capacitor, and resistors R1 and R2. Here, the resistors R1 and R2 are used for dividing the input signal by a predetermined dividing ratio. The output signal Vout, i.e., slice level signal, from the peak holding circuit is input to one of the input terminals of each of the gate circuits W-GATE and B-GATE. The magnitude of the output Vin from the differentiating circuit input to the other input terminals of the gate circuits is compared with Vout. Here, the gate circuit W-GATE is for detecting the positive peaks of Vin of FIG. 2C, while the gate circuit B-GATE is for detecting the negative peaks. Note that the slice level signal input to the gate circuit B-GATE is inverted in its polarity by an inverting circuit (X-1 in the figure).

Figure 2D:
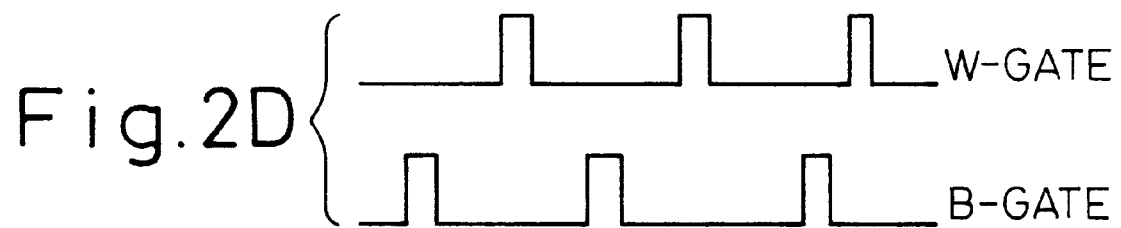

FIG. 2C shows the slice level signal (Vout) together with the differentiated signal Vin. This signal is input to the gate circuits. While the differentiated signal Vin exceeds the slice level signal Vout, signals are output from the gate circuits W-GATE and B-GATE (FIG. 2D).

The output signals from the gate circuits W-GATE and B-GATE are input to separate NAND circuits. Further, the peak signal *PKS is input to the other input terminal of the NAND circuits.

Figure 2E:
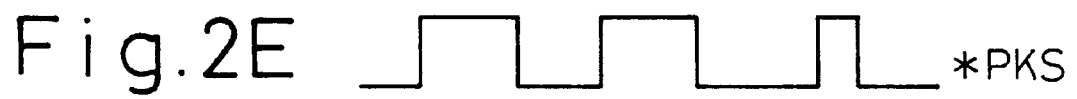

The peak signal *PKS, as shown in FIG. 2E changes in magnitude according to the period of the white bars and the period of the black bars. The peak signal *PKS rises in the period of a black bar and falls in the period of the white bar.

Figure 2F:
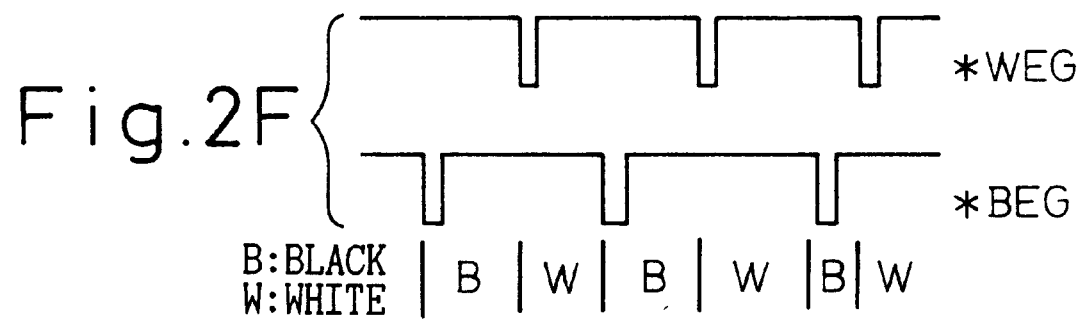

The first NAND circuit NAND1 receives as input a signal from the gate circuit W-GATE and a signal obtained by inverting the peak signal *PKS and outputs a white edge pulse signal *WEG in the period where the two signals coexist. Similarly, the second NAND circuit NAND2 receives as input a signal from the gate circuit B-GATE and the peak signal *PKS and outputs a black edge pulse signal *BEG in the period where the two signals coexist. These waveforms are shown in FIG. 2F. The signals *WEG and *BEG are input to a not shown bar width counter connected after the circuit shown in FIG. 1. This bar width counter counts the clock signals present between the signals *WEG and *BEG to detect the bar widths of the black bars and white bars. That is, the counted number of clock signals is proportional to the widths of the black bars and the white bars.

The bar width counter deems the period from the signal *BEG to *WEG to be the width of the black bar and the period from the signal *WEG to *BEG to be the width of the white bar and outputs the respective counts.

Here, as shown in FIG. 1, there is a diode voltage, i.e., a forward voltage VF, at the diode. Therefore, the output Vout (slice level signal) of the peak holding circuit may be found from:

$$Vout = Vin \times R2/(R1+R2) - Vf \times R2/(R1+R2) \qquad (1)$$

Originally speaking, the slice level signal Vout should be generated as a signal having a ratio of R2/(R1+R2) with respect to the differentiated signal (signal to be sliced) Vin, but due to the effect of the forward voltage Vf, it does not accurately become a signal Vout having the above ratio. The value of Vout ends up becoming smaller by the amount of the second term in the above equation (1). In particular, if the magnitude of the differentiated signal Vin becomes small, the effect of the second term in equation (1) gradually becomes larger and the magnitude of the slice level signal Vout ends up becoming extremely small.

On the other hand, since noise is superposed on the signal output from the photodetector PD, when the amount of light received from the bar code is small, the ratio of the signal with respect to the noise becomes small, so the effect of the superposed noise becomes relatively greater.

Figure 3A:
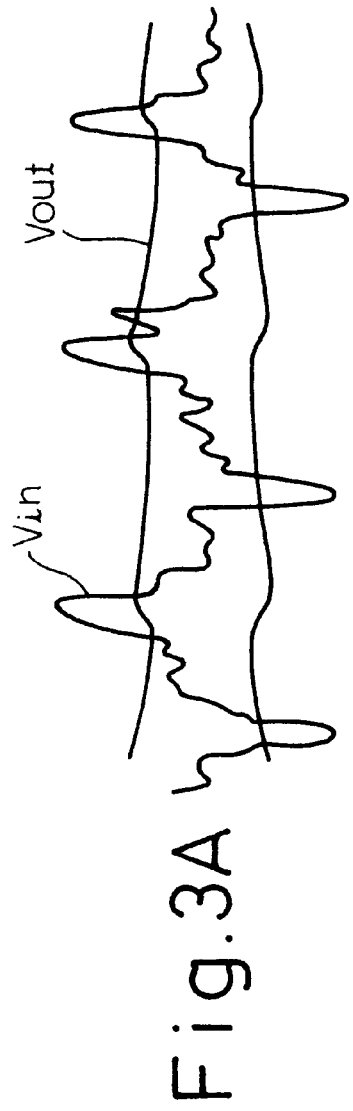

FIG. 3A shows the signal Vin output from the differentiating circuit in the case where such noise appears and the slice level signal Vout affected by the diode voltage Vf from the peak holding circuit.

As shown in FIG. 3A, when the signal output from the photodetector PD is small, the S/N ratio is poor, and the level of the slice level signal does not reach the predetermined magnitude, the signal Vin output from the differentiating circuit in some cases exceeds the slice level signal Vout at a position not a peak of the differentiated signal Vin due to the effect of the noise.

Figure 3B:
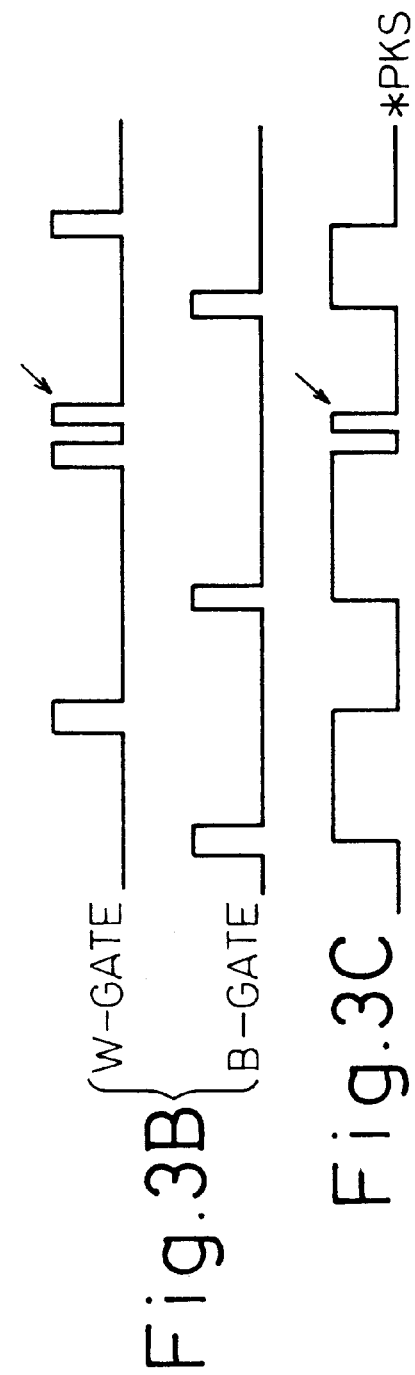

As a result, as shown in FIG. 3B, for example, there is a chance that the signal from the gate circuit W-GATE will end up being generated two consecutive times. In this case, the signals *PKS and *WEG will also be generated two consecutive times as shown in FIGS. 3B, 3C, and 3D.

When there is no effect of noise, when reading the bar code, the signals *WEG and *BEG should be generated alternately. The above bar width counter determines the bar width assuming this. If the signal *WEG is generated consecutively, however, as shown in FIG. 3D, since the signals *WEG and *BEG are not generated alternately at this portion, the bar width counter can no longer judge which signal *WEG to use as a basis for determining the bar width. Therefore, there is a possibility that it cannot calculate the bar width at the portion of * in FIG. 3D and that the bar code cannot be decoded.

Due to the possibility of the above problems, in the present invention, the circuit explained below is used to generate the slice level signal.

Figure 4:
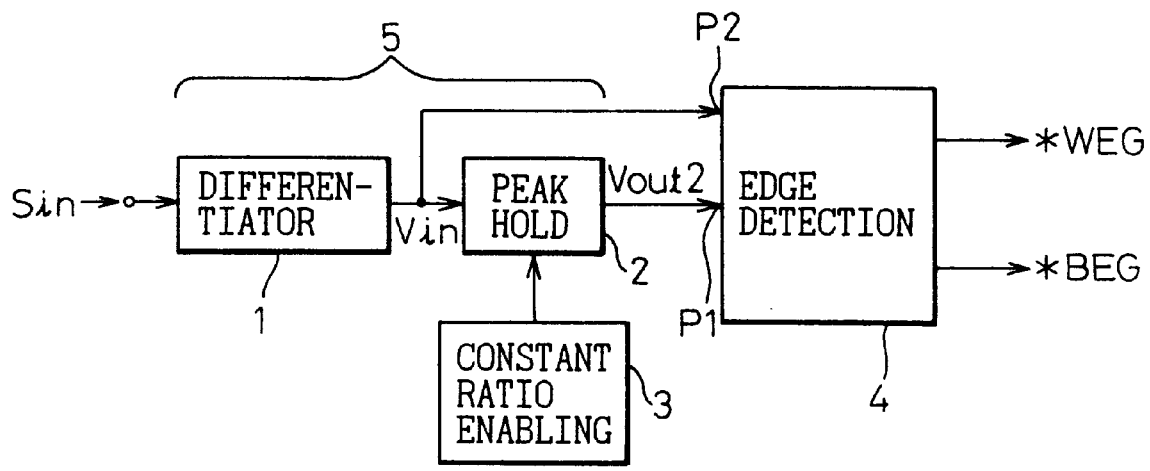
FIG. 4 is a view of the basic configuration of a binarizing circuit including a slicing ratio controlling circuit based on the present invention.

FIG. 4 is a view of the basic configuration of a binarizing circuit including a slicing ratio controlling circuit based on the present invention.

In the figure, reference numeral 5 is a slicing ratio controlling circuit for controlling the ratio of a slice level used when binarizing an input signal Sin with respect to the signal to be sliced. This circuit 5 is provided with (I) a differentiating means 1 for differentiating the input signal Sin; (ii) a peak holding means 2 for receiving the differentiated signal Vin from the differentiating means 1 and holding its peak level so as to generate a slice level signal Vout2; and (iii) a constant ratio enabling means for making the ratio of the slice level signal Vout2 from the peak holding means 2 with respect to the differentiated signal constituting the signal to be sliced a constant ratio regardless of the magnitude of the differentiated signal.

Therefore, the input signal Sin is converted to a binary signal by the slice level.

In this embodiment, the input signal Sin is a signal corresponding to the light reflected from a bar code in a bar code reader and the input signal Sin is converted to a binary signal corresponding to black bars and white bars.

Further, the bar code reader is provided with an edge detecting means (4 in FIG. 4), which edge detecting means 4 receives as input the differentiated signal Vin generated by the differentiating means 1 for each edge portion of the black bars and white bars through the peak holding means 2 at a first port P1 of the edge detecting means 4, receives the differentiated signal Vin at a second port P2 of the edge detecting means 4, and outputs edge pulses *WEG and *BEG for determining the width of the black bars and the white bars.

Figure 5:
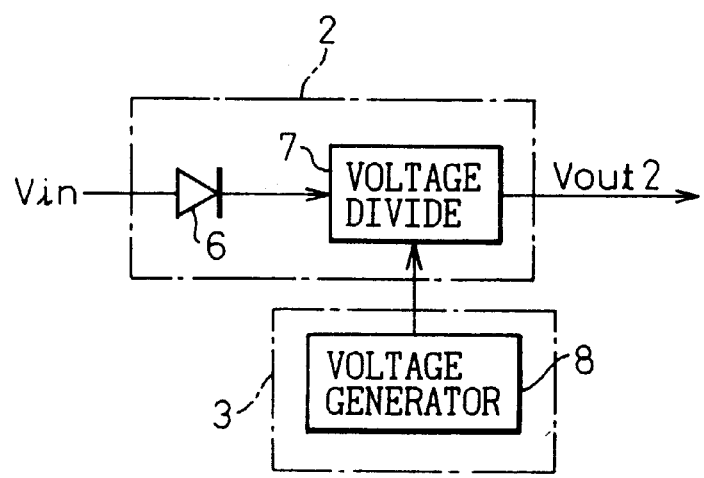
FIG. 5 is a more detailed view of the circuit blocks 2 and 3 in FIG. 4.

FIG. 5 is a more detailed view of the circuit blocks 2 and 3 in FIG. 4. In the figure, the peak holding means 2 is provided with a diode 6 receiving the differentiated signal Vin and a voltage dividing means 7 for dividing a signal output from the diode 6. Further, the constant ratio enabling means 3 is operative to give to the peak holding means 2 a voltage of a magnitude for compensating for the drop in the slice level signal due to a forward voltage Vf of the diode 6.

On the other hand, the constant ratio enabling means 3 is comprised of a voltage generator 8 which generates a voltage substantially equal to the forward voltage Vf of the diode 6.

Figure 6:
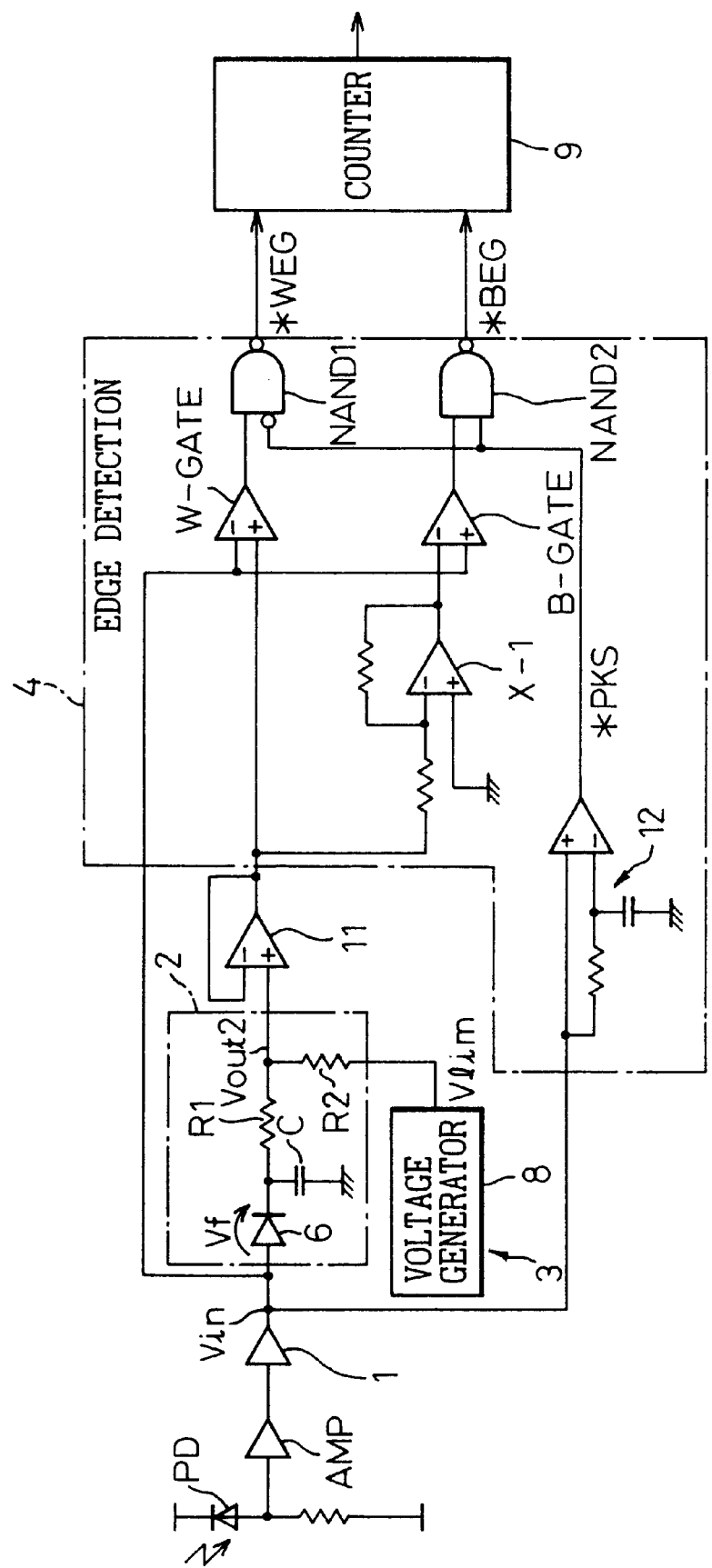
FIG. 6 is a view of an embodiment according to the present invention.

FIG. 6 is a view of an embodiment according to the present invention. To be more specific, FIG. 6 shows a part of a bar code reader. At the final stage thereof, a counter 9 counts clocks during the term when the signal *BEG is ON and the signal *WEG is ON. The thus counted values are fed to a decoder so as to decode the bar code, and thereby a resultant data is output from the decoder.

In the circuit of FIG. 6, the voltage from the diode 6, held by the capacitor C, is supplied to the first resistor R1. The voltage Vlim from the voltage generator 8 is supplied to the second resistor R2 of the peak holding means 2. By the supply of this voltage Vlim, the slice level signal Vout2 may be found by $$Vout2 = Vin \times R2/(R1+R2) - Vf \times R2/(R1+R2) + Vlim \times R1/(R1+R2) \quad (2)$$

Therefore, if the term of $Vf \times R2/(R1+R2)$ and the term of $Vlim \times R1/(R1+R2)$ can be made equal, it would be possible to eliminate the drop in the level of the slice level signal due to the effect of the diode voltage Vf. To completely eliminate the effect of the second term in the above equation (2), it is most preferable that $$Vlim = Vf \times R2/R1 \quad (3)$$

Since it is possible that the effect of the second term cannot be completely eliminated due to the variation in resistors, it is enough that the value of the voltage Vlim be made one where the effect of the second term of the above equation (2) does not substantially manifest itself.

FIG. 7A is a view for explaining the case of binarizing the differentiated signal Vin by the slice level signal generated by the peak holding circuit of FIG. 1 and the slice level signal generated by the peak holding means 2 of FIGS. 4, 5, and 6. In FIG. 7A, the solid line shows the slice level signal Vout generated by the peak holding circuit shown in FIG. 1, while the broken line shows the slice level signal Vout2 generated by the peak holding means 2 shown in FIGS. 4, 5, and 6.

In this way, the slice level signal generated by the peak holding means 2 shown in FIGS. 5 and 6 can be made larger in value than the slice level shown by the solid line since the effects of the diode voltage Vf caused by the diode 6 constituting part of the peak holding means 2 is eliminated. Therefore, in the case of the slice level signal Vout2 of FIG. 7A, even at portions where the S/N ratio is poor and the effect of the noise is believed to be great, the differentiated signal Vin will no longer exceed the slice level signal and it will be possible to reliably binarize just the edge portions of the bar code and prevent erroneous detection of edges of the bar code. As opposed to this, in the case of the conventional slice level signal Vout, erroneous detection occurs at the position of * in FIG. 7A.

The slice level signal Vout2 does not cause erroneous detection due to noise, so the signal from the gate circuit W-GATE will no longer be generated doubly and, as shown in FIG. 7D, the signals *WEG and *BEG will always be alternately generated. Therefore, it is possible to eliminate the chance of the bar width counter 9, connected at later stage, not being able to determine the bar width.

FIGS. 8A and 8B are tables comparing the conventional slice level signal Vout and the slice level signal Vout2 based on the present invention. Here, the resistors R1 and R2 are respectively 6200 ($6.20E+0.4 = 6.20 \times 10^4$) ohms and 3600 ($3.60E+0.4 = 3.60 \times 10^4$) ohms, the diode voltage Vf is 0.3 V, and the output voltage Vlim supplied to R2 is 0.2 V. Further, the table shows, in addition to the value of the differentiated signal Vin from the differentiating circuit and the values of the slice level signals Vout and Vout2, the ratio of Vin and Vout and the ratio of Vin and Vout2 (Vout2/Vin and Vout/Vin).

Further, FIG. 9 is a graph the Vout/Vin and Vout2/Vin shown in FIG. 8B. In FIG. 9, the horizontal axis shows the voltage of the differentiated signal Vin and each gradation represents 0.5 V. The vertical axis shows the slicing ratio (Vout/Vin and Vout2/Vin). Each gradation represents 20%.

Referring to these, Vout and Vout2 remain substantially the same in value up to where Vin is 04 V. Starting near where Vin is 0.6 V, however, Vout2 becomes larger in value than Vout. Therefore, in this state, it is possible to raise the slicing ratio and possible to eliminate the effect of any noise etc.

Referring to FIGS. 8A and 8B and FIG. 9 once again, from FIG. 8A, the slicing ratio used in this embodiment, that is, R2/(R1+R2), is 3.60/(6.20+3.60)=36%. (See 36% in FIG. 9.) The points <α>, <β>, and <γ> of FIG. 9 correspond to the columns <α>, <β>, and <γ> of FIG. 8B.

The effect of the present invention is shown by the arrow U in FIG. 9. The undesirable drop shown by the conventional curve is shifted upward along the arrow U according to the present invention. The curve of the present invention is maintained at a horizontal straight line (about 36%) from 0.5 V to 3 V of the differentiated signal Vin.

Referring once again to FIG. 6, the differentiating means 1 is comprised of an operational amplifier. Further, the voltage dividing means 7 includes a first resistor R1 and a second resistor R2 constituting voltage dividing resistors. The first resistor R1 receives as input the signal output from the diode 6, and the second resistor R2 receives as input the voltage output from the voltage generator 8.

The voltage dividing means 7 is provided with a voltage buffer 11 at its output side.

The portion shown by reference numeral 12 in the edge detecting means 4 is a delay type peak detection circuit.

Finally, an explanation will be made of a specific example of the voltage generator 8.

Figure 10:
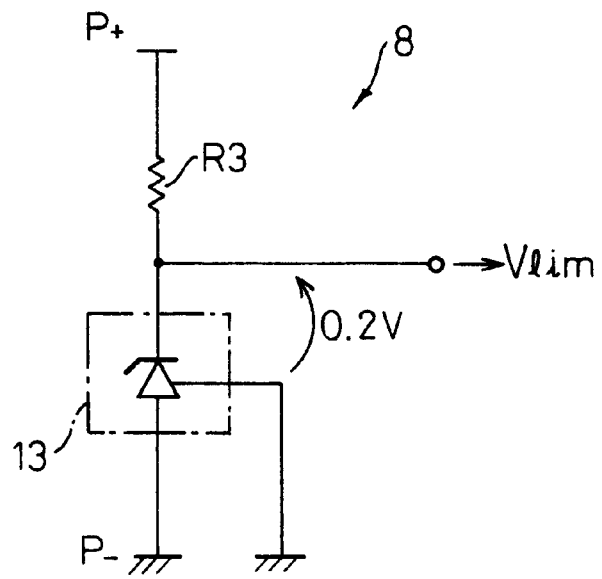
FIG. 10 is a view of a first example of a voltage generator 8.

FIG. 10 is a view of a first example of a voltage generator 8.

The voltage generator 8 is comprised of a series connected third resistor R3 which is connected between the two ends of a power source P and a regulator 13 which generates a predetermined fixed voltage, for example, 0.2 V. The fixed voltage constitutes the output voltage Vlim.

In the first example, the case where the desired output voltage Vlim, for example, 0.2 V, and the above fixed voltage are substantially the same will be shown.

If the desired output voltage Vlim, for example, 0.2 V, and the above fixed voltage do not match, the following second example is used.

Figure 11:
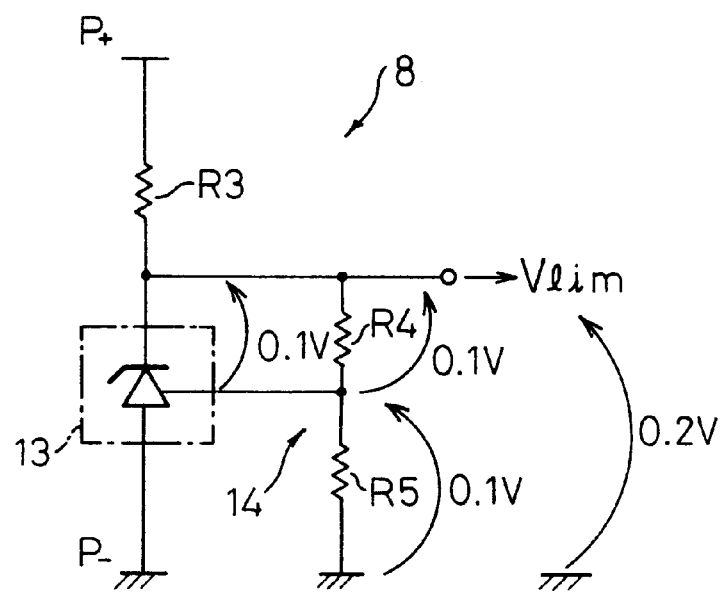
FIG. 11 is a view of a second example of a voltage generator 9.

FIG. 11 is a view of a second example of a voltage generator 8. In the second example, the fixed voltage is assumed to be 0.1 V (not 0.2 V).

A voltage dividing resistor 14 is provided at an output side of the voltage generator 8. The voltage dividing resistor 14 generates the output voltage Vlim based on the fixed voltage (0.1 V).

Note that while the present invention was explained with reference to a binarizing circuit used for a bar code reader, the present invention may be used for other applications as well. It may be used widely for applications which a slice level signal is required in some form or another.

As explained above, according to the present invention, it is possible to realize a binarizing circuit with a much greater reliability by avoiding the effects of noise.

We claim:

1. A slicing ratio controlling circuit for controlling the ratio of a slice level used when binarizing an input signal with respect to the signal to be sliced, comprising differentiating means for differentiating the input signal;
holding means for receiving the differentiated signal from the differentiating means and holding a signal related to the peak level of the differentiated signal and generating a slice level signal as a function of said signal related to the peak level of the differentiated signal; and
making means for making the ratio of the slice level signal of the holding means to the differentiated signal substantially constant for substantially all d.c. values of the differentiated signal.

2. A slicing ratio controlling circuit as set forth in claim 1, wherein said holding means is provided with:
a diode receiving said differentiated signal; and
a voltage dividing means for dividing a signal output from said diode, and wherein
said making means is operative to give to said holding means a voltage having a magnitude to compensate for the drop in the slice level signal due to a forward voltage of said diode.

3. A slicing ratio controlling circuit as set forth in claim 2, wherein said making means is comprised of a voltage generator which generates a voltage substantially equal to the forward voltage of the diode.

4. A slicing ratio controlling circuit as set forth in claim 3, wherein said voltage dividing means includes a first resistor and a second resistor constituting voltage dividing resistors, the first resistor receives as input the signal output from the diode, and the second resistor receives as input the voltage output from the voltage generator.

5. A slicing ratio controlling circuit as set forth in claim 4, wherein said voltage generator is comprised of a series connected third resistor which is connected between the two ends of a power source and a regulator which generates a predetermined fixed voltage and said fixed voltage constitutes said output voltage.

6. A slicing ratio controlling circuit as set forth in claim 5, wherein a voltage dividing resistor is provided at an output side of said voltage generator and said voltage dividing resistor generates said output voltage based on said fixed voltage.

7. A slicing ratio controlling circuit as set forth in claim 5, wherein said voltage dividing resistor is provided with a voltage buffer at its output side.

8. A slicing ratio controlling circuit as set forth in claim 1, wherein said input signal is converted to a binary signal by said slice level.

9. A slicing ratio controlling circuit as set forth in claim 8, wherein said input signal is a signal corresponding to the light reflected from a bar code in a bar code reader and said input signal is converted to a binary signal corresponding to black bars and white bars.

10. A slicing ratio controlling circuit as set forth in claim 9, wherein said bar code reader is provided with an edge detecting means, said edge detecting means receives as input said differentiated signal generated by said differentiating means for each edge portion of the black bars and white bars through the peak holding means at a first port of said edge detecting means, receives said differentiated signal at a second port of the edge detecting means, and outputs edge pulses for determining the width of the black bars and the white bars.

11. A slicing ratio controlling circuit for controlling the ratio of a slice level used when binarizing an input signal with respect to the signal to be sliced, comprising:
a differentiating circuit for differentiating the input signal;
a holding circuit for receiving the differentiated signal from the differentiating circuit and holding a signal related to the peak level of the differentiated signal and generating a slice level signal as a function of said signal related to the peak level of the differentiated signal; and a making circuit for making a ratio of the slice level signal of the holding means to the differentiated signal substantially constant for substantially all d.c. values of the differentiated signal.

12. A slicing ratio controlling as set forth in claim 11, wherein said holding circuit is provided with:

a diode receiving said differentiated signal; and a voltage dividing circuit for dividing a signal output from said diode, and wherein said making circuit is operative to give to said holding circuit a voltage having a magnitude to compensate for the drop in the slice level signal due to a forward voltage of said diode.

13. A slicing ratio controlling circuit as set forth in claim 12, wherein said making circuit is comprised of a voltage generator which generates a voltage substantially equal to the forward voltage of the diode.

14. A slicing ratio controlling circuit as set forth in claim 13, wherein said voltage dividing circuit includes a first resistor and a second resistor constituting voltage dividing resistors, the first resistor receives as input the signal output from the diode, and the second resistor receives as input the voltage output from the voltage generator.

15. A slicing ratio controlling ratio as set forth in claim 14, wherein said voltage generator is comprised of a third resistor which is connected in series between the two ends of a power source and a regulator which generates a predetermined fixed voltage and said fixed voltage constitutes said output voltage.

16. A slicing ratio controlling ratio as set forth in claim 15, wherein a voltage dividing resistor is provided at an output side of said voltage generator and said voltage dividing resistor generates said output voltage based on said fixed voltage.

17. A slicing ratio controlling circuit as set forth in claim 15, wherein said voltage dividing resistor is provided with a voltage buffer at its output side.

18. A slicing controlling circuit as set forth in claim 15, wherein said input signal is converted to a binary signal by said slice level.

19. A slicing ratio controlling circuit as set forth in claim 18, wherein said output signal is a signal corresponding to the light reflected from a bar code in a bar code reader and said input signal is converted to a binary signal corresponding to black bars and white bars.

20. A slicing ratio controlling circuit as set forth in claim 19, wherein said bar code reader is provided with an edge detecting circuit, said edge detecting circuit receives as input said differentiated signal generated by said differentiated circuit for each edge portion of the black bars and white bars through the peak holding circuit at a first port of said edge detecting circuit, receives said differentiated signal at a second port of the edge detecting circuit and outputs edge pulses for determining the width of the black bars and the white bars.

* * * * *